(12) United States Patent
Nowzari

(10) Patent No.: US 12,738,762 B2
(45) Date of Patent: Sep. 15, 2026

(54) POWER ADAPTOR AND POWER ADAPTOR OUTLET WITH BATTERY BACKUP

(71) Applicant: Nader Nowzari, Oakville (CA)

(72) Inventor: Nader Nowzari, Oakville (CA)

( * ) Notice: Subject to any disclaimer, the term of this patent is extended or adjusted under 35 U.S.C. 154(b) by 0 days.

(21) Appl. No.: 18/805,647

(22) Filed: Aug. 15, 2024

(65) Prior Publication Data

US 2025/0070592 A1 Feb. 27, 2025

Related U.S. Application Data

(60) Provisional application No. 63/520,721, filed on Aug. 21, 2023.

(51) Int. Cl.

| | |
|---|---|
| ***H02J 1/102*** | (2026.01) |
| ***H01R 31/06*** | (2006.01) |
| ***H02J 1/08*** | (2026.01) |
| ***H02J 7/61*** | (2026.01) |
| ***H02J 7/70*** | (2026.01) |
| ***H02J 7/82*** | (2026.01) |
| ***H02J 9/06*** | (2006.01) |
| ***H02J 13/12*** | (2026.01) |
| ***H02J 105/30*** | (2026.01) |
| ***H05K 7/14*** | (2006.01) |

(52) U.S. Cl.

CPC ............ *H02J 9/061* (2013.01); *H01R 31/065* (2013.01); *H02J 7/61* (2026.01); *H02J 7/751* (2026.01); *H02J 7/825* (2026.01); *H02J 9/062* (2013.01); *H02J 13/12* (2026.01)

(58) Field of Classification Search

CPC .......... H02J 9/061; H02J 7/0045; H02J 9/062; H01R 31/065

USPC ............................................................ 307/66

See application file for complete search history.

(56) References Cited

U.S. PATENT DOCUMENTS

2014/0320011 A1* 10/2014 Hegarty ................. H05B 45/10 315/132
2017/0156189 A1* 6/2017 Jayawardena .......... H02J 9/061
2017/0279295 A1* 9/2017 Wojcik ................ H01M 10/425
2025/0055302 A1* 2/2025 Giuliano ................... H02J 7/42

FOREIGN PATENT DOCUMENTS

DE 202022100095 U1 * 1/2022 .............. H02J 7/933
EP 1742324 A1 * 1/2007 ........... H01R 31/065

OTHER PUBLICATIONS

DE_202022100095_U1 (Year: 2022).*
DE-202022100095-U1 (Year: 2020).*

* cited by examiner

*Primary Examiner* — Rexford N Barnie
*Assistant Examiner* — Joshua James Sweet
(74) *Attorney, Agent, or Firm* — The H.T. Than Law Group

(57) ABSTRACT

In the present invention there is a power adaptor with backup rechargeable battery comprising a power adaptor body with a plug for receiving power from an electrical outlet, a battery charger for charging a battery with power, and a power supply outlet to deliver power to an external device from the electrical outlet or the backup battery when the plug is not receiving power. The present invention also comprises this power adaptor with backup rechargeable battery with an external device with which it communicates, such as a fire detector. The present invention further comprises a power adaptor outlet with backup rechargeable battery, having at least one electrical outlet.

17 Claims, 11 Drawing Sheets

1
2
3
12
17
18
19
21
23
25

1
22
25
19
3
2
18
23
21
26
27
17

1
11
14
18
26

21
18

10
18
2
17

1
10

14
30
12
2
28

30
3
18

25
3
21
18
19
28

1

1
2
3
15
16
17
18
19
21
23
25
28

41
43

3
25
19
19
40
18

12
20
3
25
16

1
19
36
39
33
34

20
41
3
25
19
40
31
25
22
3
25
5
19
25
36
39
33
34
19
32
29
3
25
21
22
17
32
32
29
18
17
5

5
22
35
29
37
17
+
–

41
40
25
3
39
33
34
35
32a
19
20
38
36
37
22
5
17
29
37
32

POWER ADAPTOR AND POWER ADAPTOR OUTLET WITH BATTERY BACKUP

FIELD OF THE INVENTION

The present invention relates to a power adaptor and more specifically to a power adaptor with a backup rechargeable battery and a power adaptor outlet with a backup rechargeable battery to provide an AC/DC power supply and backup rechargeable battery power supply.

BACKGROUND OF THE INVENTION

Power supply may be provided by AC/DC power or battery power. The failure of a power supply can be disruptive and even fatal, for example, the failure of a fire detector (e.g., smoke detector and/or heat detector and alarm unit). Batteries may fail with age, freezing temperature, moisture, etc. If batteries are dead, a battery powered fire detector will fail to emit an alarm in the event of a fire. The failure of batteries may be avoided with hard wiring a fire detector; however, a power outage will result in a loss of power supply and then a hard-wired fire detector will fail to emit an alarm in the event of a fire.

What is needed is a power supply that has a backup power supply for any device which needs power.

SUMMARY OF THE INVENTION

The present invention is a power adaptor with a backup rechargeable battery, comprising a power adaptor body with a plug for receiving power from an electrical outlet, a battery charger for charging a battery with power, and a power supply outlet to deliver power to an external device from the electrical outlet or the backup battery when the plug is not receiving power. In an embodiment of the invention the backup rechargeable battery is sealed inside the power adaptor body. In a further embodiment of the present invention, the backup rechargeable battery is removeable from the power adaptor body.

In an embodiment of the power adaptor with backup rechargeable battery the first end of the power cord is detachable from the power adaptor body rather than being non-detachably connected to it.

The power adaptor with backup rechargeable battery may have a plug that is an AC plug that is built-in or detachable, and a DC plug may be attachable to the AC plug, or the plug may be a DC plug.

The power adaptor with backup rechargeable battery may have a battery charger that is built-in or removable.

In a further embodiment of the present invention, the power adaptor with backup rechargeable battery additionally comprises a device indicator light to indicate that the plug is receiving power and transmitting the power through the power cord. In a further embodiment of the present invention, the power adaptor with backup rechargeable battery additionally comprises a battery indicator light to indicate that the batteries are charging. In a further embodiment of the present invention, the power adaptor with backup rechargeable battery additionally comprises a test button to test if power is being transmitted through the power cord to a device connected to a second end of the power cord.

In a further embodiment an automatic shut off switch will stop the battery from being over charged and will cut the current power to the battery when is fully charged.

In a further embodiment of the present invention there is a power adaptor charger with backup rechargeable battery and a device. In a further embodiment of the present invention there is a power adaptor with backup rechargeable battery, wherein the device is connected to a second end of the power cord, which power adaptor with backup rechargeable battery additionally comprises a test button to test if power is being transmitted through the power cord to the device by transmitting a signal to the device, and which device comprises a receiver to receive the signal and indicate if the signal is received only if power is being transmitted to the device. The device may indicate if the signal is received by emitting a noise and/or light. The device may be a fire detector.

BRIEF DESCRIPTION OF THE FIGURES

These and other aspects of the invention will be apparent from the brief description of the drawings and the following detailed description in which.

DETAILED DESCRIPTION OF THE INVENTION

Figure 1:
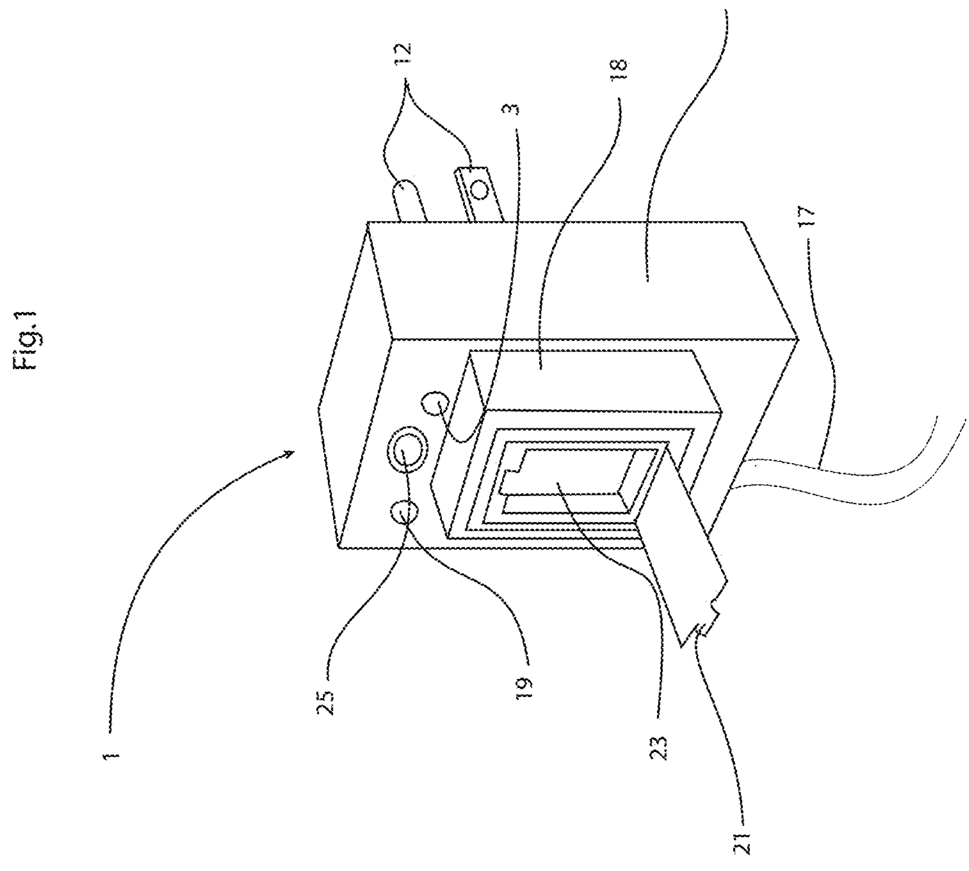
FIG. 1 is a front perspective view of an embodiment of a power adaptor with backup rechargeable battery of the present invention.

The present invention comprises a power adaptor with backup rechargeable battery 1 and a power adaptor outlet with backup rechargeable battery 5, each of which can provide AC/DC power supply and backup battery power supply. As shown in FIG. 1, the power adaptor with backup rechargeable battery 1 has a power adaptor body 2, a built-in universal plug 12, a battery charger 18 and a power supply outlet, which is in this embodiment a power supply cord 17. In this embodiment, the power supply cord 17 is attached at a first end to the power adaptor body 2 but alternatively the power supply outlet may be a power supply connector (16, 26, 28, 46 shown in other figures) in the power adaptor body 2 to connect to a power supply cord 17.

The power adaptor with backup rechargeable battery 1 supplies power to any device by connecting the device to the power supply cord 17. The figures show that the power supply cord 17 is connected (or connectable) at the first end to the power adaptor body 2. At a second end (not shown) of the power supply cord 17, it may have a connector end to connect with a device or be wired to that device or have a plug outlet(s) end.

Figure 9:
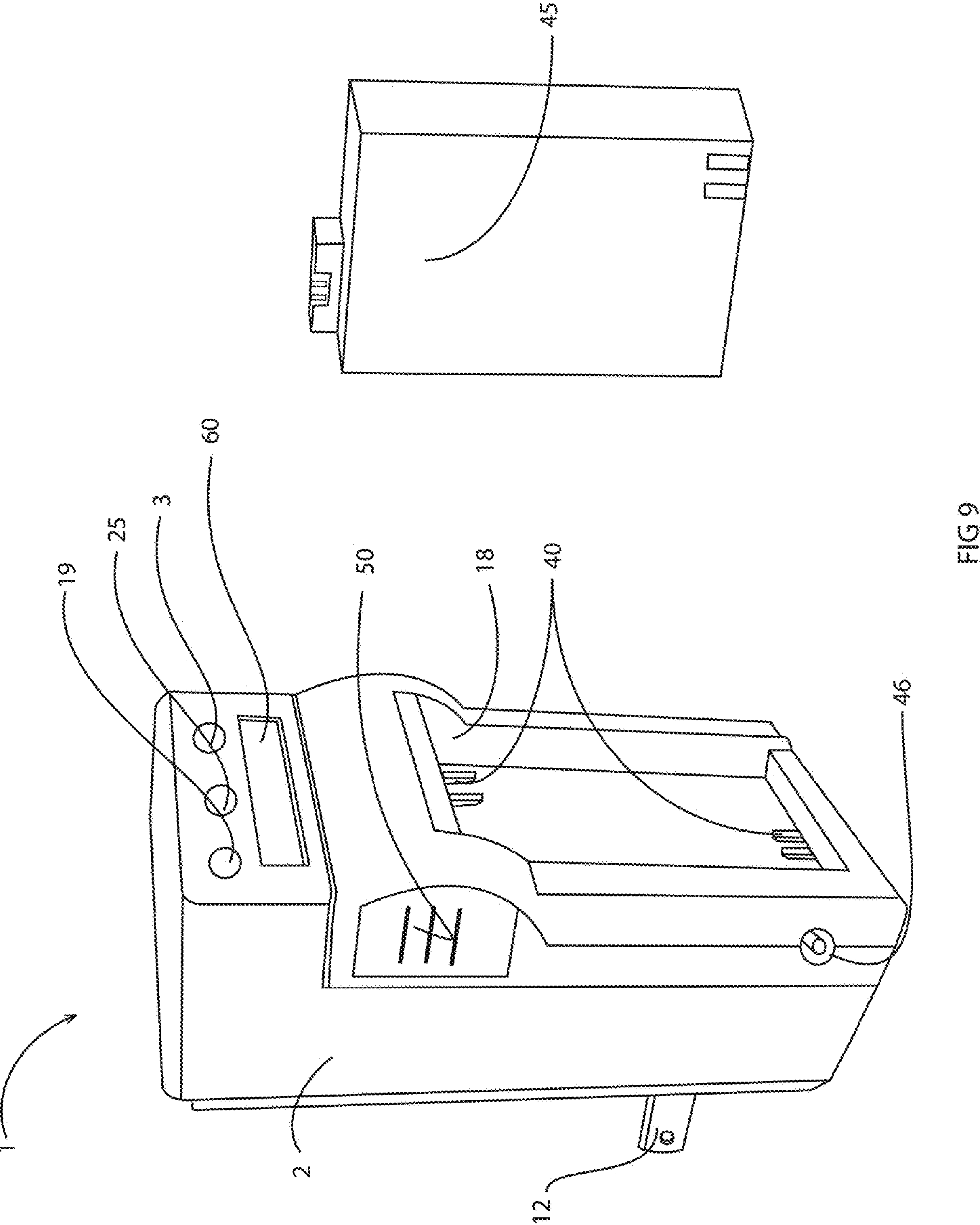
FIG. 9 is a perspective view of a ninth embodiment of a power adaptor with backup rechargeable battery without battery charge cover and a rechargeable battery.

The power adaptor with backup rechargeable battery 1 may optionally have a test button 25 to test if the device that it is connected to is receiving power. For example, if the power adaptor with backup rechargeable battery 1 is connected at the second end of the power supply cord 17 to a fire detector (which may be a smoke detector and/or heat detector) pushing the test button 25 on the power adaptor with backup rechargeable battery 1 activates the power adaptor with backup rechargeable battery 1 to send a test signal (e.g. via Bluetooth or Wi-Fi) and if it is receiving power the device indicates receipt of the signal, such as by a beeping sound emitted from the fire detector alarm. The device, such as a fire detector, needs to have a corresponding receiver to receive a test signal sent from the power adaptor with backup rechargeable battery 1 and indicate receipt of that signal, e.g., through a noise, light, sending a message to a mobile or computer device etc. Alternatively, as shown in FIG. 9, the power adaptor with backup rechargeable battery 1 may receive a signal from the fire/smoke/heat detector/alarm and a horn (or other indicator) is sounded at the power adaptor with backup rechargeable battery 1.

The battery charger 18 may be of various configurations, and in the embodiments shown in FIGS. 1 to 7 it has a battery compartment 23 with battery charger door 21. The batteries are not shown, and there may be one or more, preferably rechargeable, batteries inserted in the battery compartment 23 of the battery charger 18. It is understood that non-rechargeable batteries could be used in such a power adaptor with backup rechargeable battery 1, and adaptions would be made for non-rechargeable batteries to not have the main power supply also supply the battery or batteries with charge. However, the risk in using non-rechargeable batteries is that the non-rechargeable batteries could become dead and not act as a backup power supply.

The power adaptor with backup rechargeable battery 1 may have a battery indicator light 3 to indicate that the battery is charging since the battery indicator light 3 is supplied with power from the battery and may have a device indicator light 19 to indicate that the device to which it is connected is receiving power since the power adaptor with backup rechargeable battery 1 is supplying power to the device light indicator 19. The battery indicator light 3 receives its power from the battery to indicate the battery has power and it is working. The device indicator light 19 shows that a power supply (via the power supply cord 17 or a power supply connector 16, 26, 28, 46) is giving power to a fire/smoke detector/heat alarm and if reusable batteries (not shown) are used, the device indicator light 19 also indicates if power is being given to the battery charger 18.

Figures 2A, 2B:
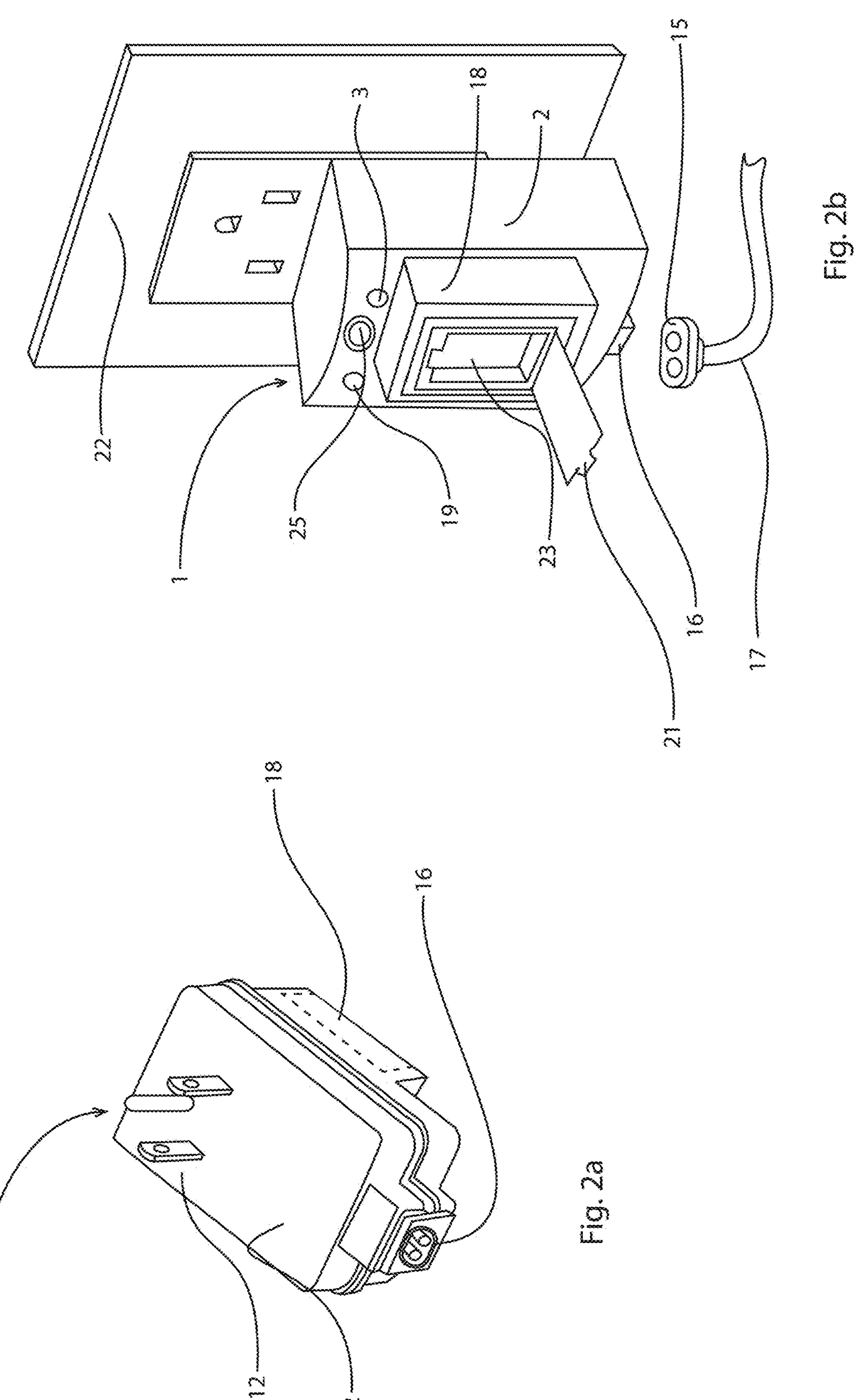
FIG. 2*a* is a back perspective view of a second embodiment of a power adaptor with backup rechargeable battery.
FIG. 2*b* is a front perspective view of the power adaptor with backup rechargeable battery of FIG. 2*a* plugged into an electrical outlet.

The power adaptor with backup rechargeable battery 1 in FIGS. 2*a* and 2*b* shows a second embodiment with a detachable power supply cord 17 having a first female connector 15 at its first end which connects with a first male power supply connector 16 on the power adaptor body 2. FIG. 2*a* shows that the power adaptor with backup rechargeable battery has a built-in universal plug 12 rather than a removable universal plug 11 as shown in FIG. 3*a*.

Figures 3A, 3B:
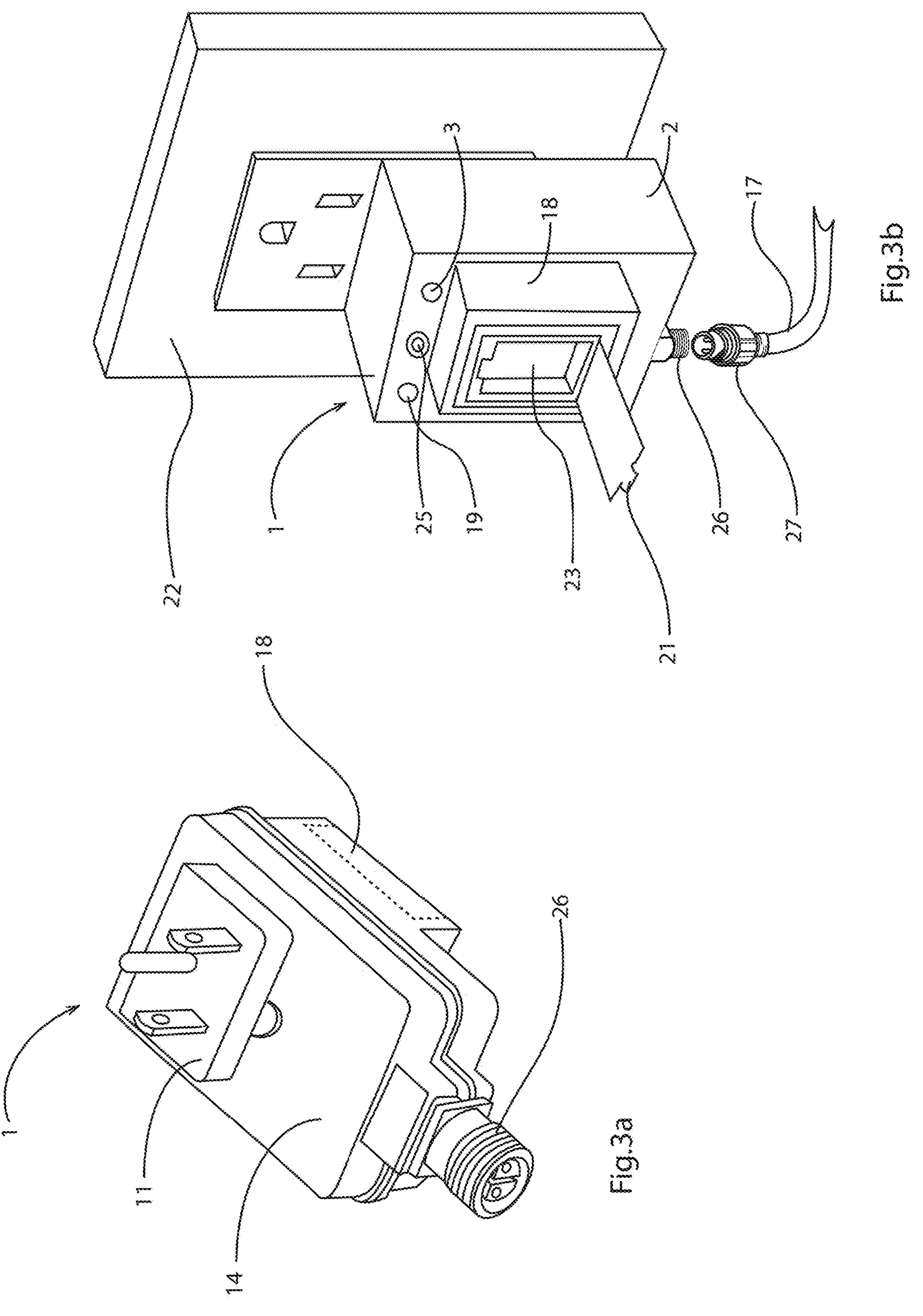
FIG. 3*a* is a back perspective view of a third embodiment of a power adaptor with backup rechargeable battery.
FIG. 3*b* is a front perspective view of the power adaptor with backup rechargeable battery of FIG. 3*a* plugged into an electrical outlet.

The power adaptor with backup rechargeable battery 1 in FIGS. 3*a* and 3*b* shows a third embodiment in which the detachable power supply cord 17 has a second male connector 27 at its first end which connects with a second female power supply connector 26 on the power adaptor body 2.

Figures 4A, 4B, 4C:
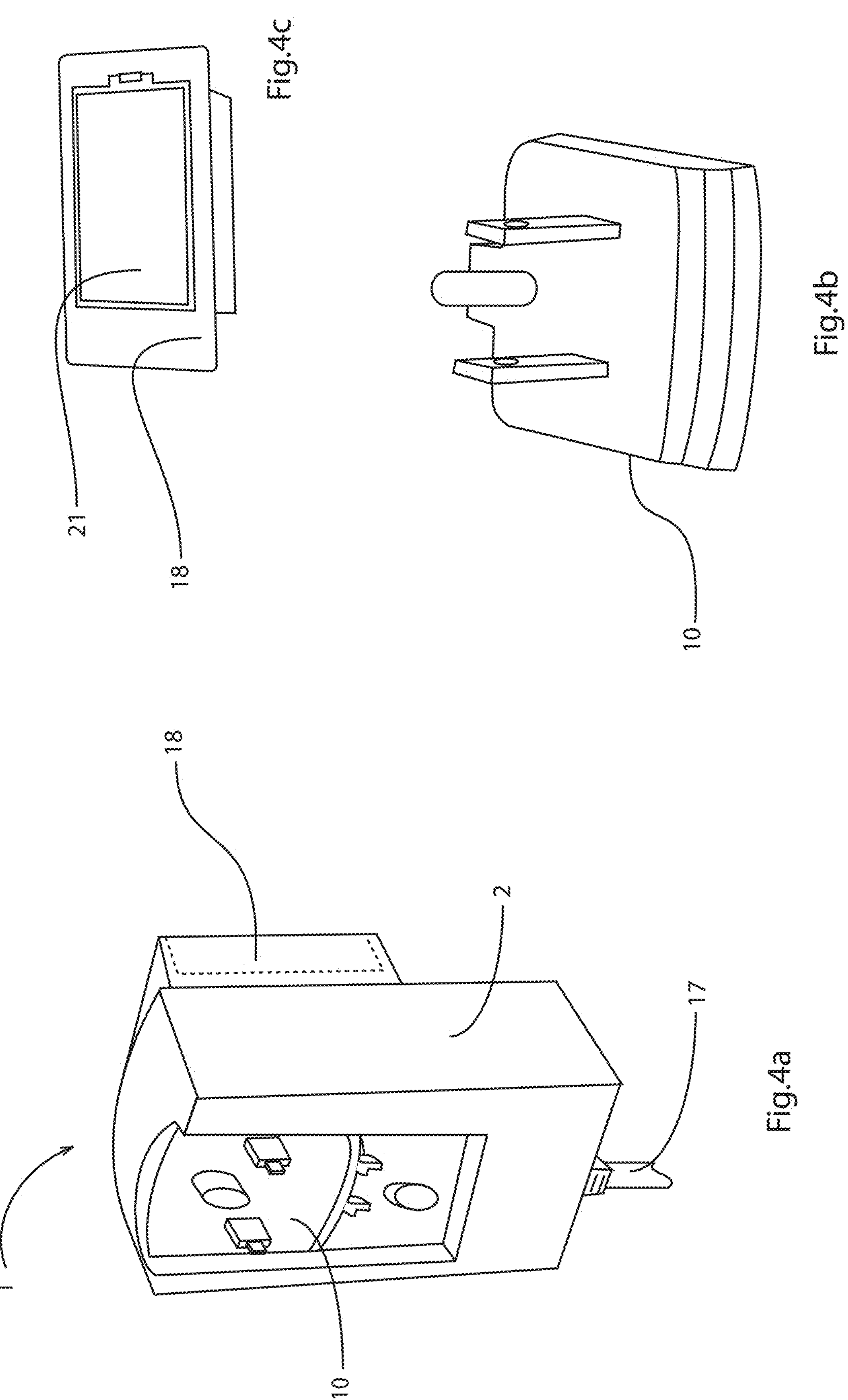
FIG. 4*a* is a back perspective view of a fourth embodiment of a power adaptor with backup rechargeable battery.
FIG. 4*b* is a bottom perspective view of the removable plug of the power adaptor with backup rechargeable battery of FIG. 4*a*.
FIG. 4*c* is a front perspective view of the battery charger of the power adaptor with backup rechargeable battery of FIG. 4*a*.

The power adaptor with backup rechargeable battery 1 in FIG. 4*a* shows a fourth embodiment in which there is a sliding universal plug 10 and the power supply cord 17 is attached to the power adaptor body 2. FIG. 4*b* shows the sliding universal plug 10 and FIG. 4*c* shows the battery charger 18 with the battery charger door 21. The battery charger 18 may be built in or removable as shown here so that it can be repaired or replaced.

Figures 5A, 5B, 5C:
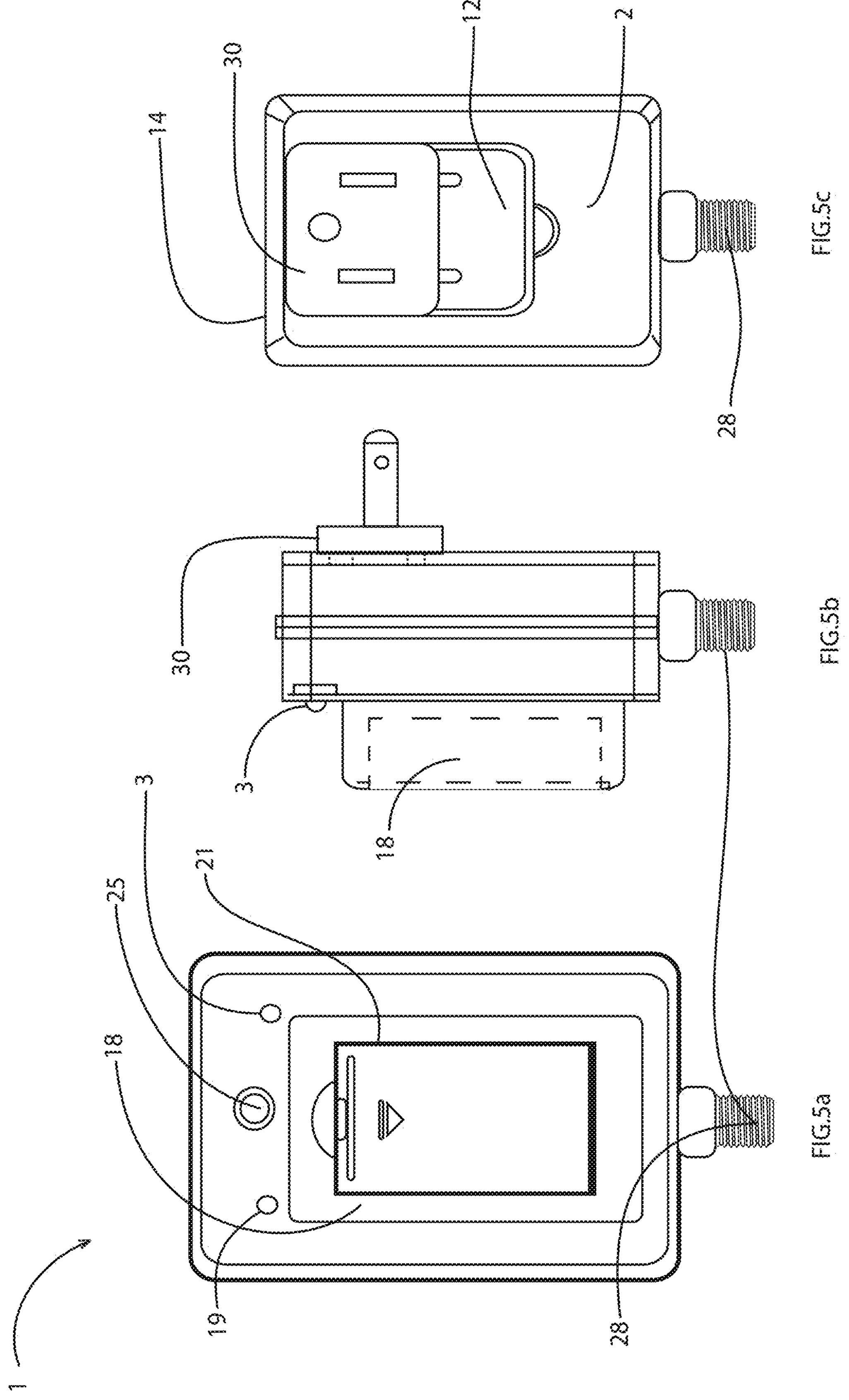
FIG. 5*a* is a front view of a fifth embodiment of a power adaptor with backup rechargeable battery.
FIG. 5*b* is a right-side view of the power adaptor with backup rechargeable battery of FIG. 5*a*.
FIG. 5*c* is a back view of the power adaptor with backup rechargeable battery of FIG. 5*a*.

The power adaptor with backup rechargeable battery 1 in FIGS. 5*a*, 5*b* and 5*c* shows a fifth embodiment with a DC plug 30 plugged into built-in universal plug 12, and a threaded power supply connector 28 on the power adaptor body 2 to connect to a power supply cord 17 with a first end connectable to the threaded power supply connector 28.

Figures 6, 7:
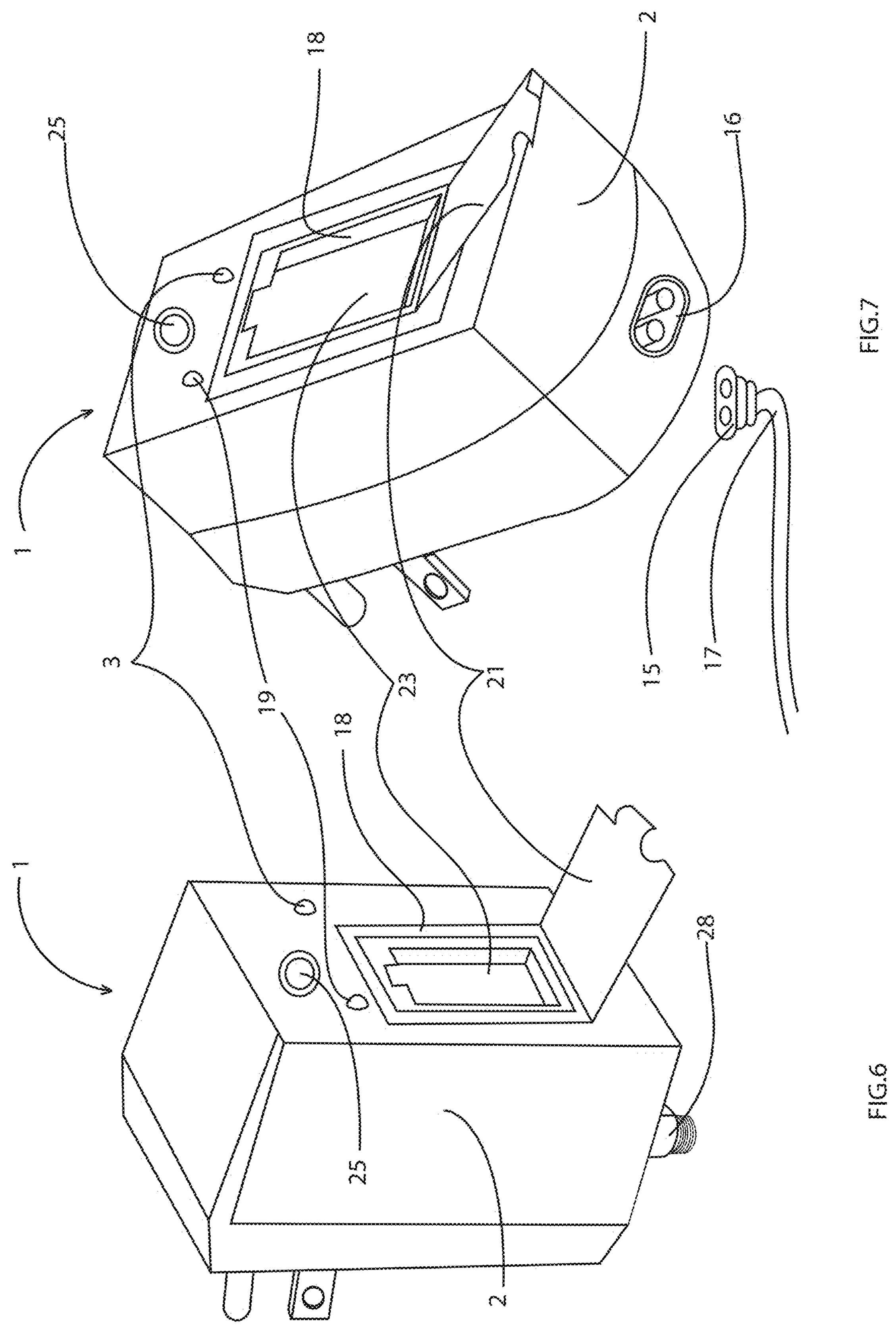
FIG. 6 is a front perspective view of a sixth embodiment of a power adaptor with backup rechargeable battery.
FIG. 7 is a front perspective view of a seventh embodiment of a power adaptor with backup rechargeable battery.

The power adaptor with backup rechargeable battery 1 in FIG. 6 shows a sixth embodiment with a built-in battery charger 18 and the threaded power supply connector 28 on the power adaptor body 2. The power adaptor with backup rechargeable battery 1 in FIG. 7 shows a seventh embodiment with a built-in battery charger 18 and the detachable power supply cord 17 having the first female connector 15 at its first end which connects with the first male power supply connector 16 on the power adaptor body 2.

Figures 8A, 8B, 8C:
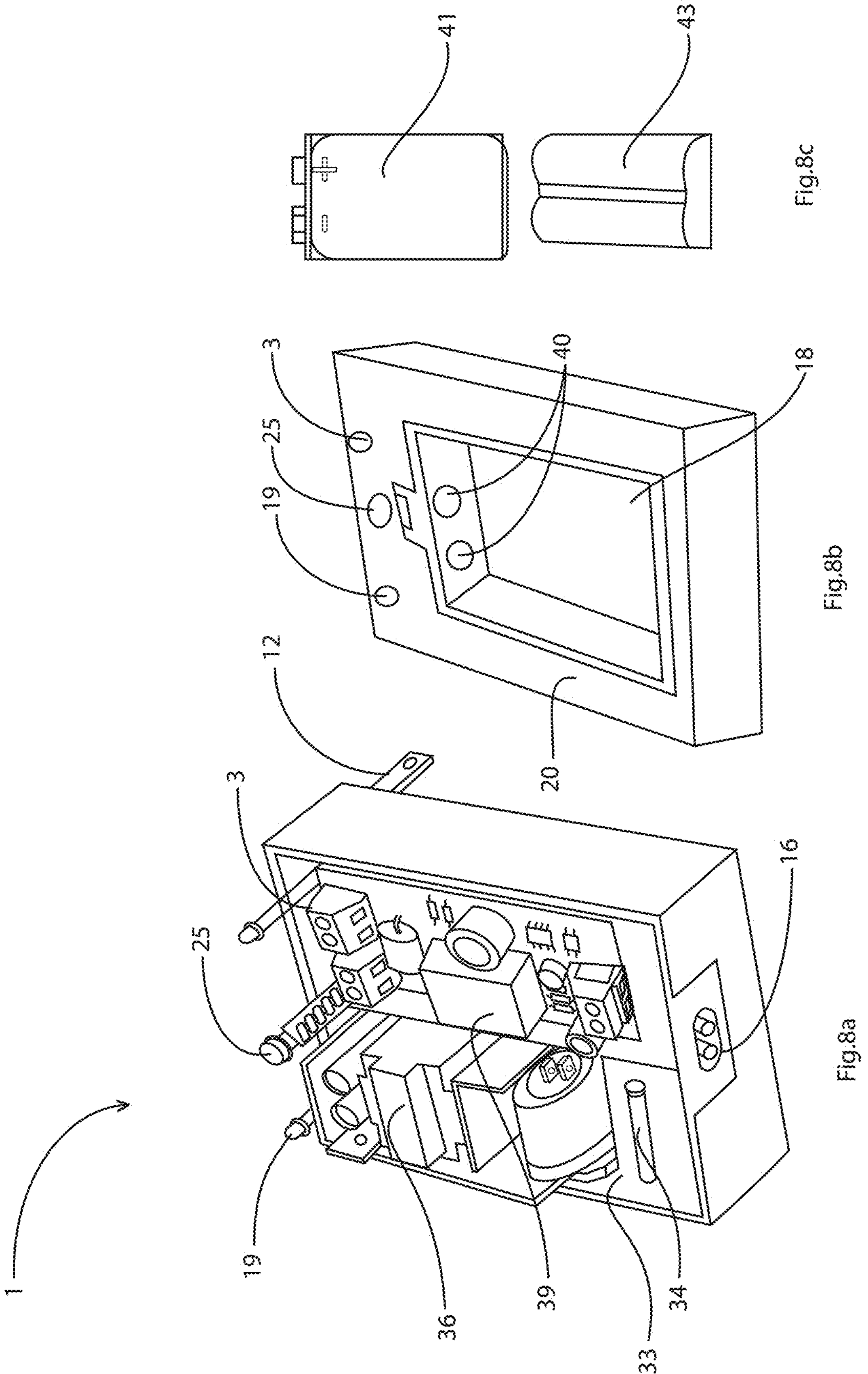
FIG. 8*a* is a front perspective view of an eighth embodiment of a power adaptor with backup rechargeable battery without battery charger cover.
FIG. 8*b* is a front perspective view of the battery charger cover of the power adaptor with backup rechargeable battery of FIG. 8*a*.
FIG. 8*c* is a front perspective view of battery supplies.

FIG. 8*a* shows an eighth embodiment of a power adaptor with a backup rechargeable battery 1 without the battery charger cover 20 which is shown in FIG. 8*b*, and an optional 9 Volt rechargeable battery 41 or 9 Volt removeable rechargeable battery or battery pack 43 (shown in FIG. 8*c*) that can be used as the backup rechargeable battery when placed in the battery compartment having battery contacts 40 provided. The battery charger cover 20 is off to show a microcontroller circuit 33 with fuse 34, transformer 36, and relay 39. 220/120 volt power is converted to 5 volt by a circuit board converter (not shown) in order to supply power to a 9 volt rechargeable battery. When any rechargeable battery is fully charged there is an automatic shut off relay/switch to stop charging the battery until it is drained of power and needs recharging.

FIG. 9 shows a ninth embodiment of a power adaptor with backup rechargeable battery 1 with rechargeable battery 45 to provide power during a power outage to a device, such as a fire/smoke/heat detector device. The rechargeable battery 45 is charged/recharged by power supplied through battery contacts 40 to battery charger 18 when the power adaptor body 2 is plugged through built-in universal plug 12 (or any plug) into an electrical outlet 22 (not shown) that is receiving power. The rechargeable batteries can be easily replaced when needed. A further example of a third male power supply connector 46 is shown which would connect to a power supply cord 17.

The source of power for the power adaptor with backup rechargeable battery 1 is the power from the building's AC through the electrical outlet 22 that it is plugged into. There is a transformer 36 within the power adaptor body 2 to convert AC power to low DC voltage. This DC low voltage power is transmitted through the power supply cord 17 (or power supply connector) to a device, such as fire detector. In an embodiment of the present invention, this DC low voltage power also goes to the battery charger 18 to charge rechargeable batteries (not shown).

In alternative embodiments, the plug may be removeable (either sliding out or unplugging) or could be a DC plug or could be by an AC plug onto which a DC plug may be added. The power adaptor with backup rechargeable battery 1 may be made weatherproof for use in a garage or other outbuildings without temperature control.

Figure 12:
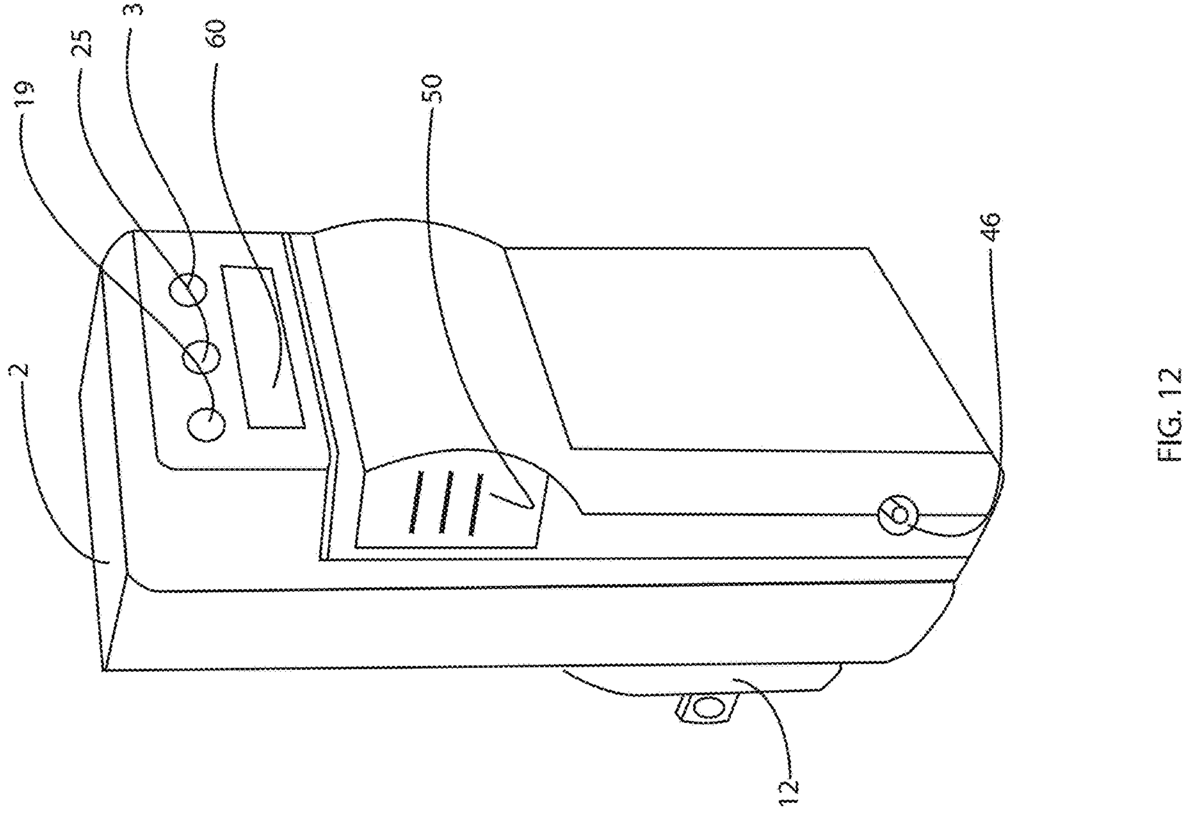
FIG. 12 is a front perspective view of an embodiment of a power adaptor with backup rechargeable battery having a battery sealed in the power adaptor body.

In an embodiment of the invention shown in FIG. 12, the backup rechargeable battery is sealed inside the power adaptor body. In other embodiments of the present invention, the backup rechargeable battery is removeable from the power adaptor body (see FIGS. 1 to 11).

The power adaptor with backup rechargeable battery 1 may avoid falls or accidents as a result of homeowners or individuals testing or replacing the battery of a fire/heat/smoke alarm/detector device since testing of the device itself is not needed when the device is powered by the power adaptor with backup rechargeable battery 1 which may be in an easily reached electrical outlet. Such devices as fire alarms are usually located up high and may require the use of a ladder and/or be difficult to reach. It is easy to change any batteries of the power adaptor with backup rechargeable battery 1 when it is plugged into a low electrical outlet.

In use, the power adaptor with backup rechargeable battery 1 with appropriate plug is plugged into an electrical outlet supplying AC or DC power and the second end of the power supply cord 17 is connected to a device. If the main power fails, then automatically the back-up battery kicks in to supply power to the device. When there is a power outage and there is no power supplied to the power adaptor body 2 through the electrical outlet 22 shown in FIGS. 2*b* and 3*b*, a microcontroller circuit 33 (not shown) within the power adaptor body 2 includes a switch to automatically switch to the battery power. In a further embodiment of the invention, there is an optional battery switch button to choose battery power over the main power supply, for example, if the main power is being shut off for any reason. In a further embodiment of the invention, there is no breaker circuit and the rechargeable battery 45 provides the power to any device directly and not as an alternative to the power from the electrical outlet 22 which only powers the rechargeable battery 45.

In the embodiment of the power adaptor with backup rechargeable battery 1 wherein the power adaptor with backup rechargeable battery 1 communicates via the test button 25, the device includes a receiver. The device may be a fire detector that sounds a test alarm when the test button 25 is pushed on the power adaptor with backup rechargeable battery 1 unless the device is not receiving power (or has failed in another way). Alternatively, the power adaptor with backup rechargeable battery 1 receives and emits or displays an alert sent from the device. As shown in FIG. 9, there is a speaker 50 for a horn (not shown) and an adaptor (not shown) which receives signals (via Bluetooth/Wi-Fi) as a test or when fire/heat/smoke is detected and sounds the horn in the power adaptor with backup rechargeable battery 1. Further in this embodiment, a display 60 powered by the microcontroller circuit 33 shows the WiFi/Bluetooth connection and/or battery life.

FIGS. 10*a*, 10*b*, 11*a* and 11*b* show the power adaptor outlet with backup rechargeable battery 5. FIGS. 2*b* and 3*b* show the power adaptor with backup rechargeable battery 1 with an electrical outlet 22, whereas in the embodiment shown in FIGS. 10*a*, 10*b*, 11*a* and 11*b*, a power adaptor with backup rechargeable battery 1 is combined with an electrical outlet 22 to result in the power adaptor outlet with backup rechargeable battery 5. The power adaptor outlet with backup rechargeable battery 5 also supplies power to any device by plugging the device into it or alternatively there is a power supply cord 17 that may be directly wired to a device.

Figures 10A, 10B:
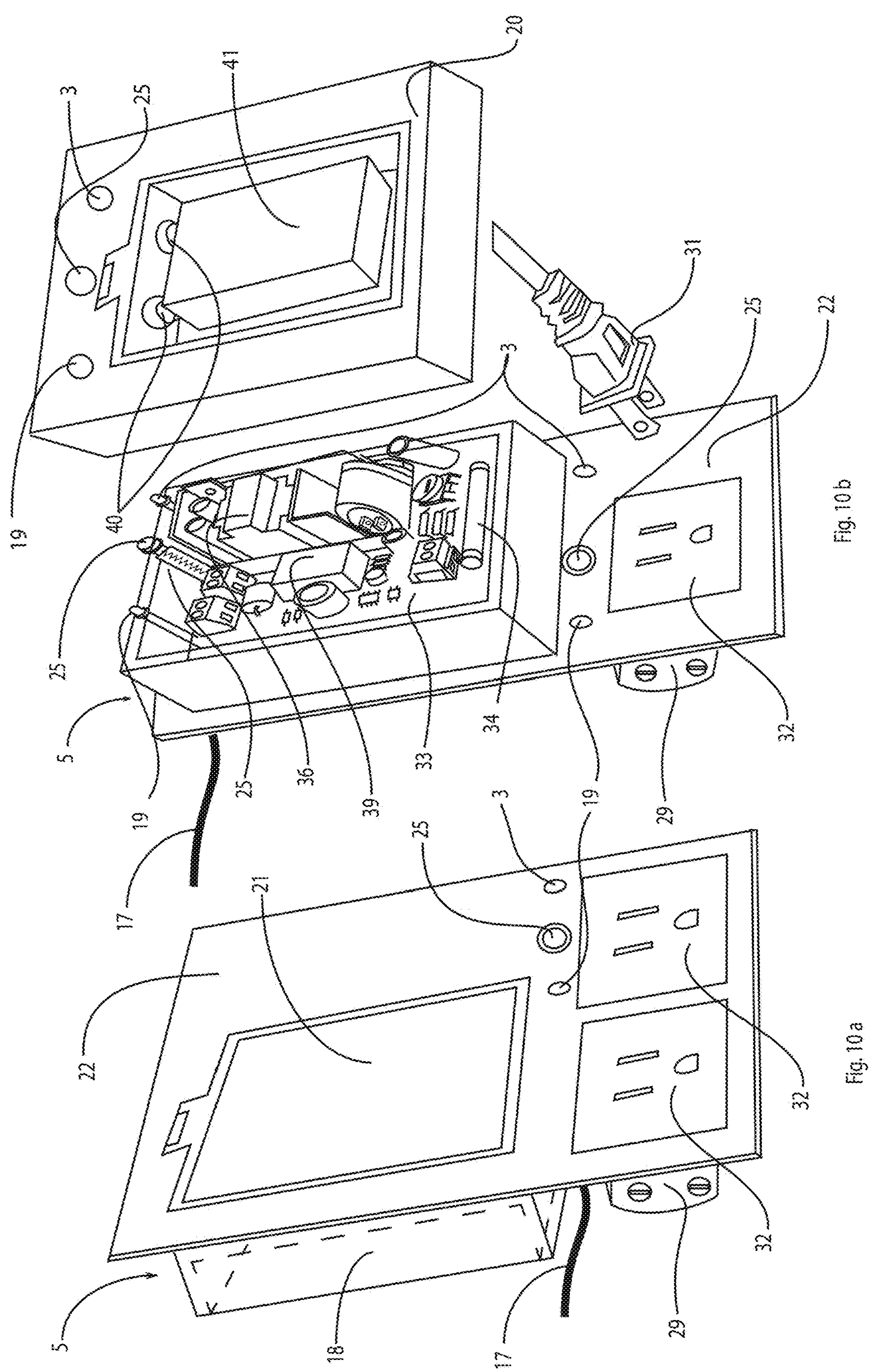
FIG. 10*a* is a right front perspective view of a first embodiment of a power adaptor outlet with backup rechargeable battery.
FIG. 10*b* is a right front perspective view of a second embodiment of a power adaptor outlet with backup rechargeable battery without battery charger cover.
Figure 11:
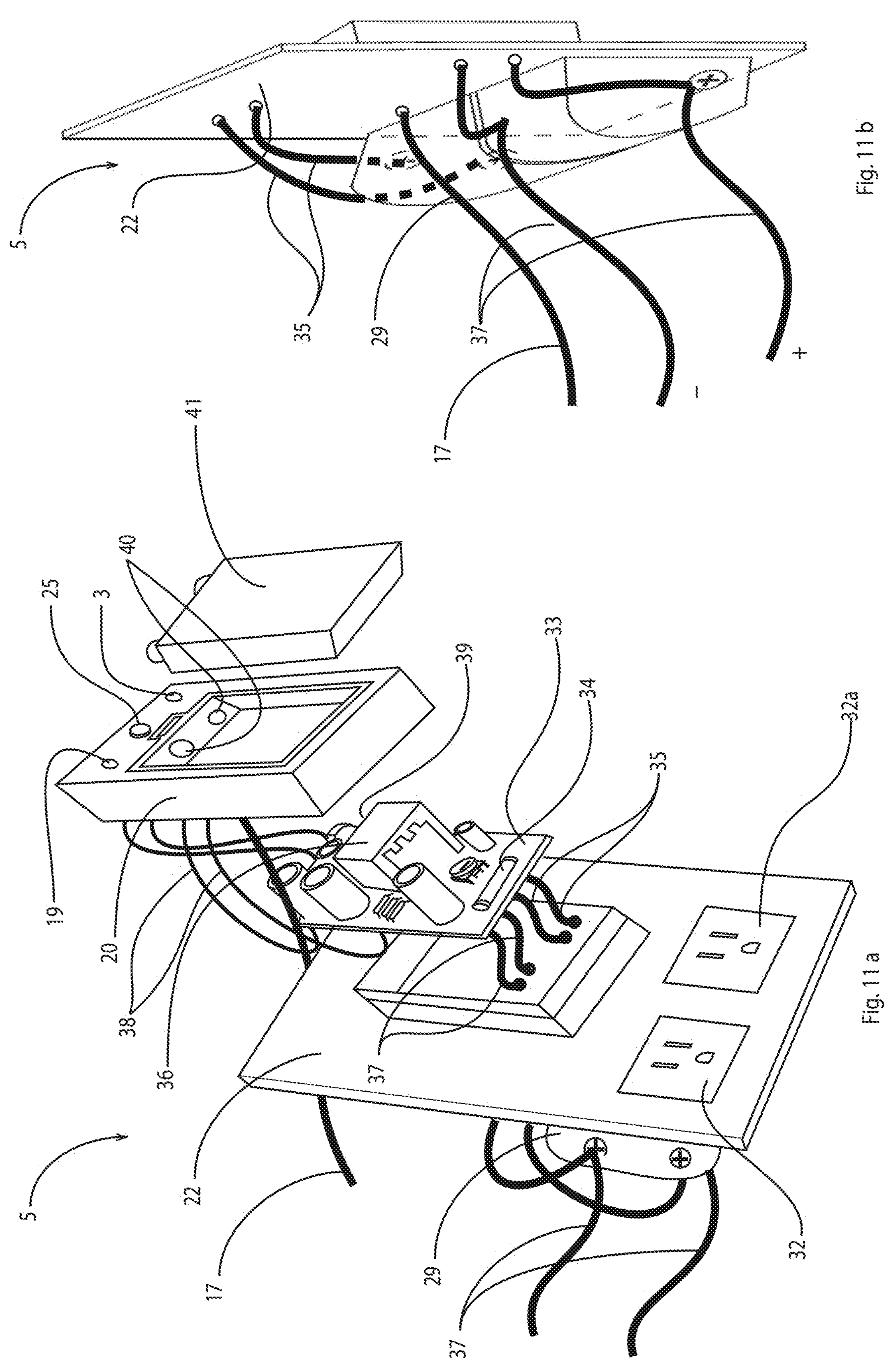
FIG. 11*a* is an exploded front perspective view of a third embodiment of a power adaptor outlet with backup rechargeable battery.
FIG. 11*b* is a back perspective view of the power adaptor outlet with backup rechargeable battery of FIG. 10*a*.

In the embodiment shown in FIG. 10*a*, there are two outlets, namely a first outlet 32 supplied from a DC low voltage adaptor 29 and a second outlet 32*a* connected directly to the AC power.

FIG. 10*b* shows a further embodiment of a power adaptor outlet with backup rechargeable battery 5 in which there is only the first outlet 32 supplied from the DC low voltage adaptor 29. Also shown is a plug 31 which is connected to a device, which may be a fire detector. The embodiment of the invention shown in FIGS. 10*a* and 10*b* allow the adaptor to be placed at the back of the electrical outlet 22 so that the adaptor can be hidden behind the wall thereby providing a flat surface for the outlet 22.

FIGS. 10*a* and 10*b* show both AC and DC outlets 32. The AC outlet 32*a* and DC outlet 32 may be labeled with different colours so a user can identify which outlet is DC and what outlet is AC.

FIGS. 11*a* and 11*b* show the microcontroller circuit 33 comprises a fuse 34, DC output from transformer wires 35, transformer 36, AC input to transformer wires 37, relay 39, and DC output to battery wires 38 connecting to battery contacts 40. The embodiment of the present invention shown in FIGS. 11*a* and 11*b* are designed to have the adaptor on the front surface of an electrical outlet 22.

The power adaptor outlet with backup rechargeable battery 5 has the battery charger 18 as described above for the power adaptor with backup rechargeable battery 1 and may have the optional test button 25 described above. The power adaptor outlet with backup rechargeable battery 5 may have the battery indicator light 3 to indicate that the battery (or batteries) is charging since the battery indicator light 3 is supplied with power from the battery (or batteries). The power adaptor outlet with backup rechargeable battery 5 may have the device indicator light 19 to indicate that a main power supply is supplying power to the first outlet 32 and/or second outlet 32*a*.

In use, when one outlet is present (such as in FIG. 10*b*) a plug 31 is plugged into first outlet 32 and in the event of a power failure the back up battery will supply power to the outlet. When two outlets 32, 32*a* are present (such as in FIG.

10*a*) when there is a power failure, the back-up battery will supply power to DC outlet 32, and AC outlet 32*a* is not usable.

The second outlet 32*a* allows the user/homeowner to use it for any other use such as vacuum, charging homeowner's electronic devices, etc. This outlet is adaptable with both current 220/120 voltage. If the main power supply fails, then automatically the backup battery kicks in to supply power to any device connected to the first outlet 32. The DC low voltage is not capable of powering outlet 32*a*. When there is a power outage and there is no power supplied to the first outlet 32 and/or second outlet 32*a*, a microcontroller circuit 33 (shown in FIGS. 8*b*, 10*a*) has a switch which automatically kicks in and switches to the backup battery power.

The battery or batteries are connected to the charger which is connected to the transformer 36 to be charged and when there is no power will automatically switch via the microcontroller circuit 33 to supply power to the device. The charger receives its power from the transformer which is connected to the microcontroller circuit 33.

It will be understood that there can be other configurations of the power adaptor outlet with backup rechargeable battery 5 that have any combination of the battery charger 18 on the back as shown in FIG. 8*a* or on the front as shown in FIG. 8*b*, and have two outlets (either two first outlets 32 or two second outlets 32*a* or a first outlet 32 and a second outlet 32*a*) or have one outlet (either a first outlet 32 or a second outlet 32*a*).

While embodiments of the invention have been described in the detailed description, the scope of the claims should not be limited by the preferred embodiments set forth in the examples, but should be given the broadest interpretation consistent with the description as a whole.

What is claimed is:

1. A power adaptor with a backup rechargeable battery for providing a continuous source of power to a fire, heat or smoke external detection device, for testing that the external detection device is receiving power, and for providing an audible alert when the external detection device is activated, comprising:

- a power adaptor body with a plug for receiving power from an electrical outlet,
- a battery charger for charging a battery with power having a relay, a test button, a power adaptor receiver, and a speaker,
- a power supply outlet to deliver power to the external device from the electrical outlet or the backup rechargeable battery when the plug is not receiving power,
- an automatic battery switch button to change power delivery to the external detection device between battery power and power from the electrical outlet,
- a receiver in the external detection device to receive a test signal via a wireless communication signal sent from the power adaptor with backup rechargeable battery when the test button is pressed to test if power is being transmitted to the power supply outlet, and the external detection device emits a noise and/or light and/or display to confirm receipt of the test signal and thereby confirming that the external detection device is receiving power from the power adaptor with a backup rechargeable battery,
- wherein the power adaptor receiver receives an alert signal via the wireless communication signal sent from the external detection device when the detection device is activated,
- and wherein the relay automatically stops charging the battery when the battery is fully charged and automatically starts charging the battery when the battery is drained of power and needs recharging,
- and wherein a microcontroller circuit having a switch in the power adaptor body automatically switches to the backup rechargeable battery to provide continuous power to the external device when no power is supplied to the power adaptor body through the electrical outlet.

2. The power adaptor with the backup rechargeable battery of claim 1, in which the power supply outlet is a connector which is attachable to a power supply cord.

3. The power adaptor with the backup rechargeable battery of claim 1, in which the plug is an AC plug that is built-in or detachable.

4. The power adaptor with the backup rechargeable battery of claim 3, which additionally comprises a DC plug attachable to the AC plug.

5. The power adaptor with the backup rechargeable battery of claim 1, in which the plug is a DC plug.

6. The power adaptor with the backup rechargeable battery of claim 1, in which the battery charger is built-in or removable.

7. The power adaptor with the backup rechargeable battery of claim 1, which additionally comprises a device indicator light to indicate that the plug is receiving power and transmitting the power to the power supply outlet.

8. The power adaptor with the backup rechargeable battery of claim 1, which additionally comprises a battery indicator light to indicate that the battery is charging.

9. The power adaptor with the backup rechargeable battery of claim 1, wherein the fire, heat or smoke external detection device is a fire detector.

10. The power adaptor with the backup rechargeable battery of claim 1 in which the power adaptor with the backup rechargeable battery additionally comprises a battery indicator light to indicate that the batteries are charging.

11. A power adaptor outlet comprising the power adaptor with the backup rechargeable battery of claim 1 and at least one electrical outlet.

12. The power adaptor outlet of claim 11, wherein there are two outlets.

13. The power adaptor outlet with the backup rechargeable battery of claim 11, wherein there is one outlet supplied from a DC low voltage adaptor.

14. The power adaptor outlet of claim 11, wherein at least one electrical outlet is a first electrical outlet supplied from a DC low voltage adaptor and a second electrical outlet connected to an AC power supply.

15. The power adaptor outlet of claim 11, in which the battery charger is built-in or removable.

16. The power adaptor outlet of claim 11, which additionally comprises a device indicator light to indicate that a main power supply is supplying power to the at least one outlet.

17. The power adaptor outlet of claim 11, which additionally comprises a battery indicator light to indicate that the batteries are charging.

* * * * *